US008200688B2

(12) United States Patent
Messer et al.

(10) Patent No.: US 8,200,688 B2
(45) Date of Patent: *Jun. 12, 2012

(54) METHOD AND SYSTEM FOR FACILITATING INFORMATION SEARCHING ON ELECTRONIC DEVICES

(75) Inventors: Alan Messer, Los Gatos, CA (US); Doreen Cheng, San Jose, CA (US); Anugeetha Kunjithapatham, Sunnyvale, CA (US); Phuong Nguyen, San Jose, CA (US); Priyang Rathod, Mountain View, CA (US); Mithun Sheshagiri, Mountain View, CA (US); Simon J. Gibbs, San Jose, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 485 days.

This patent is subject to a terminal disclaimer.

(21) Appl. No.: 11/969,778

(22) Filed: Jan. 4, 2008

(65) Prior Publication Data
US 2008/0183698 A1    Jul. 31, 2008

Related U.S. Application Data (63) Continuation-in-part of application No. 11/713,370, filed on Mar. 1, 2007, and a continuation-in-part of application No. 11/713,350, filed on Mar. 1, 2007, and a continuation-in-part of application No. 11/713,312, filed on Mar. 1, 2007, and a continuation-in-part of application No. 11/725,865, filed on Mar. 20, 2007, and a continuation-in-part of application No. 11/726,340, filed on Mar. 21, 2007, and a continuation-in-part of application No. 11/732,887, filed on Apr. 5, 2007, and a continuation-in-part of application No. 11/789,609, filed on Apr. 25, 2007, and a continuation-in-part of application No. 11/803,826, filed on May 15, 2007, and a continuation-in-part of application No. 11/821,938, filed on Jun. 26, 2007, and a continuation-in-part of application No. 11/823,005, filed on Jun. 26, 2007, and a continuation-in-part of application No. 11/825,161, filed on Jul. 5, 2007, and a continuation-in-part of application No. 11/879,569, filed on Jul. 20, 2007, and a continuation-in-part of application No. 11/969,837, filed on Jan. 4, 2008.

(60) Provisional application No. 60/898,257, filed on Jan. 29, 2007, provisional application No. 60/780,400, filed on Mar. 7, 2006, provisional application No. 60/780,398, filed on Mar. 7, 2006, provisional application No. 60/780,105, filed on Mar. 7, 2006, provisional application No. 60/903,962, filed on Feb. 28, 2007, provisional application No. 60/904,044, filed on Feb. 28, 2007, provisional application No. 60/906,082, filed on Mar. 9, 2007.

(51) Int. Cl.
*G06F 17/30* (2006.01)

(52) U.S. Cl. ........... 707/767; 707/772; 725/53; 348/465

(58) Field of Classification Search .................. 707/731, 707/734, 767–768
See application file for complete search history.

(56) References Cited

U.S. PATENT DOCUMENTS 5,481,296 A    1/1996   Cragun et al.
(Continued)

FOREIGN PATENT DOCUMENTS

CN        1393107       1/2003
(Continued)

OTHER PUBLICATIONS

Henzinger, Monika, et al., Query-Free News Search, World Wide Web vol. 8, issue 2, Springer Netherlands, pp. 101-126 (2005).*
(Continued)

*Primary Examiner* — Christyann Pulliam
(74) *Attorney, Agent, or Firm* — Beyer Law Group LLP (57) ABSTRACT

A method and system for facilitating information searching for a user of an electronic device is provided. Facilitating searches involves obtaining information about the user interests, identifying potential data of interest to the user, extracting data related to said data of interest to the user, and collecting the extracted related data for presentation to the user on the device.

17 Claims, 6 Drawing Sheets

U.S. PATENT DOCUMENTS

| | | | |
|---|---|---|---|
| 5,703,655 A | 12/1997 | Corey et al. | |
| 5,790,935 A | 8/1998 | Payton | |
| 5,974,406 A | 10/1999 | Bisdikian et al. | |
| 5,983,214 A * | 11/1999 | Lang et al. | 707/1 |
| 5,983,237 A | 11/1999 | Jain et al. | |
| 5,995,959 A | 11/1999 | Friedman et al. | |
| 6,151,603 A | 11/2000 | Wolfe | |
| 6,253,238 B1 | 6/2001 | Lauder et al. | |
| 6,317,710 B1 * | 11/2001 | Huang et al. | 704/246 |
| 6,334,127 B1 | 12/2001 | Bieganski et al. | |
| 6,412,073 B1 * | 6/2002 | Rangan | 726/5 |
| 6,438,579 B1 | 8/2002 | Hosken | |
| 6,480,844 B1 * | 11/2002 | Cortes et al. | 379/88.23 |
| 6,637,028 B1 | 10/2003 | Voyticky et al. | |
| 6,714,909 B1 * | 3/2004 | Gibbon et al. | 704/246 |
| 6,721,748 B1 * | 4/2004 | Knight et al. | 707/1 |
| 6,766,523 B2 | 7/2004 | Herley | |
| 6,774,926 B1 | 8/2004 | Ellis et al. | |
| 6,801,895 B1 * | 10/2004 | Huang et al. | 704/270 |
| 6,807,675 B1 | 10/2004 | Maillard | |
| 6,826,512 B2 | 11/2004 | Dara-Abrams et al. | |
| 6,842,877 B2 | 1/2005 | Robarts et al. | |
| 6,954,755 B2 | 10/2005 | Reisman | |
| 6,981,040 B1 * | 12/2005 | Konig et al. | 709/224 |
| 7,028,024 B1 | 4/2006 | Kommers et al. | |
| 7,054,875 B2 * | 5/2006 | Keith, Jr. | 707/1 |
| 7,062,561 B1 * | 6/2006 | Reisman | 709/227 |
| 7,069,575 B1 | 6/2006 | Goode et al. | |
| 7,110,998 B1 | 9/2006 | Bhandari et al. | |
| 7,158,961 B1 | 1/2007 | Charikar | |
| 7,158,986 B1 * | 1/2007 | Oliver et al. | 707/102 |
| 7,162,473 B2 | 1/2007 | Dumais et al. | |
| 7,165,080 B2 | 1/2007 | Kotcheff et al. | |
| 7,181,438 B1 | 2/2007 | Szabo | |
| 7,184,959 B2 * | 2/2007 | Gibbon et al. | 704/270 |
| 7,194,460 B2 | 3/2007 | Komamura | |
| 7,203,940 B2 | 4/2007 | Barmettler et al. | |
| 7,225,187 B2 | 5/2007 | Dumais et al. | |
| 7,284,202 B1 | 10/2007 | Zenith | |
| 7,305,384 B2 * | 12/2007 | Omoigui | 709/231 |
| 7,343,365 B2 | 3/2008 | Farnham et al. | |
| 7,363,294 B2 | 4/2008 | Billsus et al. | |
| 7,386,542 B2 | 6/2008 | Maybury et al. | |
| 7,389,224 B1 | 6/2008 | Elworthy | |
| 7,389,307 B2 | 6/2008 | Golding | |
| 7,433,935 B1 | 10/2008 | Obert | |
| 7,552,114 B2 | 6/2009 | Zhang et al. | |
| 7,565,345 B2 | 7/2009 | Bailey et al. | |
| 7,593,921 B2 | 9/2009 | Goronzy et al. | |
| 7,603,349 B1 | 10/2009 | Kraft et al. | |
| 7,617,176 B2 | 11/2009 | Zeng et al. | |
| 7,634,461 B2 | 12/2009 | Oral et al. | |
| 7,657,518 B2 | 2/2010 | Budzik et al. | |
| 7,664,734 B2 * | 2/2010 | Lawrence et al. | 707/767 |
| 7,685,192 B1 | 3/2010 | Scofield et al. | |
| 7,716,158 B2 | 5/2010 | McConnell | |
| 7,716,199 B2 | 5/2010 | Guha | |
| 7,793,326 B2 | 9/2010 | McCoskey | |
| 8,060,905 B1 | 11/2011 | Hendricks | |
| 8,065,697 B2 | 11/2011 | Wright et al. | |
| 8,115,869 B2 | 2/2012 | Rathod et al. | |
| 2001/0003214 A1 * | 6/2001 | Shastri et al. | 725/109 |
| 2001/0023433 A1 | 9/2001 | Natsubori et al. | |
| 2002/0022491 A1 | 2/2002 | McCann et al. | |
| 2002/0026436 A1 | 2/2002 | Joory | |
| 2002/0087535 A1 | 7/2002 | Kotcheff et al. | |
| 2002/0161767 A1 | 10/2002 | Shapiro et al. | |
| 2002/0162121 A1 | 10/2002 | Mitchell | |
| 2003/0028889 A1 | 2/2003 | McCoskey | |
| 2003/0033273 A1 | 2/2003 | Wyse | |
| 2003/0105682 A1 | 6/2003 | Dicker et al. | |
| 2003/0131013 A1 * | 7/2003 | Pope et al. | 707/100 |
| 2003/0158855 A1 | 8/2003 | Farnham et al. | |
| 2003/0172075 A1 * | 9/2003 | Reisman | 707/10 |
| 2003/0184582 A1 | 10/2003 | Cohen | |
| 2003/0221198 A1 * | 11/2003 | Sloo | 725/136 |
| 2003/0229900 A1 * | 12/2003 | Reisman | 725/87 |
| 2003/0231868 A1 | 12/2003 | Herley | |
| 2004/0031058 A1 | 2/2004 | Reisman | |
| 2004/0073944 A1 | 4/2004 | Booth | |
| 2004/0194141 A1 | 9/2004 | Sanders | |
| 2004/0244038 A1 | 12/2004 | Utsuki et al. | |
| 2004/0249790 A1 | 12/2004 | Komamura | |
| 2005/0004910 A1 | 1/2005 | Trepess | |
| 2005/0137996 A1 * | 6/2005 | Billsus et al. | 707/1 |
| 2005/0144158 A1 | 6/2005 | Capper et al. | |
| 2005/0154711 A1 | 7/2005 | McConnell | |
| 2005/0160460 A1 | 7/2005 | Fujiwara et al. | |
| 2005/0177555 A1 | 8/2005 | Alpert et al. | |
| 2005/0240580 A1 * | 10/2005 | Zamir et al. | 707/4 |
| 2005/0246726 A1 | 11/2005 | Labrou et al. | |
| 2005/0289599 A1 * | 12/2005 | Matsuura et al. | 725/53 |
| 2006/0026152 A1 | 2/2006 | Zeng et al. | |
| 2006/0028682 A1 | 2/2006 | Haines | |
| 2006/0036593 A1 | 2/2006 | Dean et al. | |
| 2006/0066573 A1 | 3/2006 | Matsumoto | |
| 2006/0074883 A1 | 4/2006 | Teevan et al. | |
| 2006/0084430 A1 | 4/2006 | Ng | |
| 2006/0095415 A1 | 5/2006 | Sattler et al. | |
| 2006/0106764 A1 * | 5/2006 | Girgensohn et al. | 707/3 |
| 2006/0133391 A1 | 6/2006 | Kang et al. | |
| 2006/0136670 A1 | 6/2006 | Brown et al. | |
| 2006/0156326 A1 | 7/2006 | Goronzy et al. | |
| 2006/0161542 A1 | 7/2006 | Cucerzan et al. | |
| 2006/0195362 A1 | 8/2006 | Jacobi et al. | |
| 2006/0212897 A1 * | 9/2006 | Li et al. | 725/32 |
| 2006/0242283 A1 | 10/2006 | Shaik et al. | |
| 2007/0043703 A1 | 2/2007 | Bhattacharya et al. | |
| 2007/0050346 A1 | 3/2007 | Goel et al. | |
| 2007/0061222 A1 | 3/2007 | Allocca et al. | |
| 2007/0061352 A1 | 3/2007 | Dimitrova et al. | |
| 2007/0073894 A1 | 3/2007 | Erickson et al. | |
| 2007/0078822 A1 | 4/2007 | Cuzerzan et al. | |
| 2007/0107019 A1 | 5/2007 | Romano et al. | |
| 2007/0130585 A1 | 6/2007 | Perret et al. | |
| 2007/0143266 A1 | 6/2007 | Tang et al. | |
| 2007/0156447 A1 | 7/2007 | Kim et al. | |
| 2007/0179776 A1 | 8/2007 | Segond et al. | |
| 2007/0198485 A1 | 8/2007 | Ramer et al. | |
| 2007/0198500 A1 | 8/2007 | Lucovsky et al. | |
| 2007/0198508 A1 * | 8/2007 | Yoshimura | 707/5 |
| 2007/0214123 A1 | 9/2007 | Messer et al. | |
| 2007/0214488 A1 | 9/2007 | Nguyen et al. | |
| 2007/0220037 A1 | 9/2007 | Srivastava et al. | |
| 2007/0233287 A1 | 10/2007 | Sheshagiri et al. | |
| 2007/0300078 A1 | 12/2007 | Ochi et al. | |
| 2008/0040316 A1 | 2/2008 | Lawrence | |
| 2008/0082744 A1 | 4/2008 | Nakagawa | |
| 2008/0114751 A1 | 5/2008 | Cramer et al. | |
| 2008/0133501 A1 | 6/2008 | Andersen et al. | |
| 2008/0133504 A1 | 6/2008 | Messer et al. | |
| 2008/0162651 A1 | 7/2008 | Madnani | |
| 2008/0162731 A1 | 7/2008 | Kauppinen et al. | |
| 2008/0183596 A1 | 7/2008 | Nash et al. | |
| 2008/0183681 A1 | 7/2008 | Messer et al. | |
| 2008/0183698 A1 | 7/2008 | Messer et al. | |
| 2008/0204595 A1 | 8/2008 | Rathod et al. | |
| 2008/0208839 A1 | 8/2008 | Sheshagiri et al. | |
| 2008/0235209 A1 | 9/2008 | Rathod et al. | |
| 2008/0235393 A1 | 9/2008 | Kunjithapatham et al. | |
| 2008/0242279 A1 | 10/2008 | Ramer et al. | |
| 2008/0250010 A1 | 10/2008 | Rathod et al. | |
| 2008/0266449 A1 | 10/2008 | Rathod et al. | |
| 2008/0288641 A1 | 11/2008 | Messer et al. | |
| 2009/0029687 A1 | 1/2009 | Ramer et al. | |
| 2009/0055393 A1 | 2/2009 | Messer | |
| 2009/0077065 A1 | 3/2009 | Song et al. | |
| 2009/0112848 A1 | 4/2009 | Kunjithapatham et al. | |
| 2010/0070895 A1 | 3/2010 | Messer | |
| 2010/0091182 A1 * | 4/2010 | Gibbon et al. | 348/441 |
| 2010/0191619 A1 | 7/2010 | Dicker et al. | |
| 2010/0293165 A1 * | 11/2010 | Eldering et al. | 707/737 |

FOREIGN PATENT DOCUMENTS

| | | |
|---|---|---|
| CN | 1585947 | 2/2005 |
| CN | 1723458 | 1/2006 |
| CN | 1808430 | 7/2006 |

| | | |
|---|---|---|
| JP | 2003-099442 | 4/2003 |
| KR | 10-2002-0005147 A | 1/2002 |
| KR | 10-2002-0006810 A | 1/2002 |
| KR | 10-2004-0052339 A | 6/2004 |
| KR | 10-2006-0027226 | 3/2006 |
| WO | WO 01/37465 A2 | 5/2001 |
| WO | WO 02/43310 | 5/2002 |
| WO | WO 02/43310 A2 | 5/2002 |
| WO | WO 03/042866 | 5/2003 |
| WO | WO 2005/055196 A2 | 6/2005 |
| WO | WO 2007/004110 A2 | 1/2007 |

OTHER PUBLICATIONS

Weiyu Zhu; Toklu, C.; Shih-Ping Liou; Automatic news video segmentation and categorization based on closed-captioned text, IEEE International Conference on Multimedia and Expo 2001, pp. 829-832, 22-25 (Aug. 2001) doi: 10.1109/ICME.2001.1237850.*

Ma, Qiang et al., Context-Sensitive Complementary Information Retrieval for Text Stream, Database and Expert Systems Applications, Springer Berlin / Heidelberg, pp. 471-481 (2005). doi: 10.1007/11546924_46.*

Microsoft Corporation, Microsoft Windows Media Player 10, http://www.microsoft.com/windows/windowsmedia/mp10, Jun. 2004, US.

Realnetworks, Inc., http://www.real.com, Jun. 1997, US.

Copernic Inc., Copernic Search Engine for your PC, http://www.copernic.com, Sep. 19, 2008, US.

Miyamori, H. et al., "Webified Video: Media Conversion from TV Programs to Web Content for Cross-Media Information Integration," Proceedings of the 16th International Conference on Database and Expert Systems Applications, 2005, pp. 176-185, Springer-Verlag, Berlin, Heidelberg.

Moraveji, N. et al., "DynaLine: A Non-Disruptive TV User Interface for Passive Browsing of Internet Video," Microsoft Research Technical Report, 2006, pp. 1-4.

Notification of Transmittal of the International Search Report and the Written Opinion of the International Searching Authority for International Application No. PCT/KR2008/001558, dated Jun. 26, 2008, 10 pages.

Livingston, K. et al., "Beyond Broadcast," 8th International Conference on Intelligent User Interfaces, Jan. 2003, pp. 260-262, Association for Computing Machinery, New York, NY.

Notification of Transmittal of the International Search Report and the Written Opinion of the International Searching Authority, dated Aug. 20, 2008; International Search Report and Written Opinion of the International Searching Authority for International Application No. PCT/KR2008/001941, 10 pages.

U.S. Non-Final Office Action for U.S. Appl. No. 11/726,340 mailed May 19, 2009.

U.S. Non-final Office Action for U.S. Appl. No. 11/732,887 mailed on Jun. 5, 2009.

Notification of Transmittal of the International Search Report and the Written Opinion of the International Searching Authority; International Search Report and Written Opinion of the International Searching Authority for Application No. PCT/KR2008/000537 dated May 15, 2008, 16 pages.

Chinese Office Action dated Aug. 14, 2009 issued in Chinese Patent Application No. 2008100826213 (English language translation included).

U.S. Non-final Office Action for U.S. Appl. No. 11/803,826 mailed on Jul. 24, 2009.

U.S. Non-final Office Action for U.S. Appl. No. 11/725,865 mailed Sep. 16, 2010.

U.S. Final Office Action for U.S. Appl. No. 11/713,350 mailed Sep. 9, 2010.

U.S. Non-final Office Action for U.S. Appl. No. 11/633,880 mailed May 11, 2010.

AOL LLC, http://www.aol.com, downloaded Sep. 19, 2008, pp. 1-2, United States.

Ask Search Engine, http://www.ask.com, downloaded Sep. 19, 2008, pp. 1, United States.

U.S. Advisory Action for U.S. Appl. No. 11/633,880 mailed Nov. 25, 2009.

U.S. Non-final Office Action for U.S. Appl. No. 11/900,847 mailed Oct. 28, 2009.

"Placement in the DMOZ.org directory—Pure Power", DMOZ / Google Directory, posted on Apr. 30, 2005, p. 1, http://www.ahfx.net/weblog/13.

U.S. Office Action for U.S. Appl. No. 11/633,880 mailed Jan. 6, 2009.

U.S. Office Action for U.S. Appl. No. 11/633,880 mailed Aug. 10, 2009.

U.S. Final Office Action for U.S. Appl. No. 11/713,350 mailed Mar. 2, 2009.

U.S. Final Office Action for U.S. Appl. No. 11/713,350 mailed Aug. 14, 2009.

U.S. Non-final Office Action for U.S. Appl. No. 11/725,865 mailed Oct. 16, 2009.

U.S. Final Office Action for U.S. Appl. No. 11/725,865 mailed Mar. 16, 2010.

U.S. Non-final Office Action for U.S. Appl. No. 11/713,350 mailed Mar. 8, 2010.

U.S. Non-final Office Action for U.S. Appl. No. 11/808,826 mailed on Mar. 3, 2010.

U.S. Office Action for U.S. Appl. No. 11/726,340 mailed Oct. 14, 2010.

U.S. Office Action for U.S. Appl. No. 11/726,340 mailed Feb. 14, 2011.

U.S. Office Action for U.S. Appl. No. 11/726,340 mailed Dec. 9, 2009.

U.S. Office Action for U.S. Appl. No. 12/263,089 mailed Mar. 25, 2011.

U.S. Office Action for U.S. Appl. No. 11/732,887 mailed on Dec. 4, 2009.

U.S. Office Action for U.S. Appl. No. 11/725,865 mailed Mar. 4, 2011.

U.S. Office Action for U.S. Appl. No. 11/633,880 mailed Mar. 17, 2011.

U.S. Office Action for U.S. Appl. No. 11/803,826 mailed Jun. 1, 2011.

Office Action dated Jun. 27, 2011 from U.S. Appl. No. 11/725,865.

Office Action dated Oct. 6, 2010 from U.S. Appl. No. 11/981,019.

Office Action dated Dec. 29, 2009 from U.S. Appl. No. 11/981,019.

Final Office Action dated Mar. 16, 2011 from U.S. Appl. No. 11/981,019.

Final Office Action dated Jun. 17, 2010 from U.S. Appl. No. 11/981,019.

Office Action dated Aug. 2, 2011 from U.S. Appl. No. 11/713,312.

Google Inc., webhp, http://www.google.com/webhp?complete-1&hl-en, downloaded Sep. 25, 2008, p. 1.

Office Action dated Mar. 25, 2010 from Chinese Patent Application No. 200810082621.3, 7pp., China (English-language translation included—15 pp).

Tivo Inc., http://www.tivo.com, downloaded Sep. 19, 2008, 1 page.

"Computing Meng Individual Project, ANSES—Automatic News Summarization and Extraction System," http://mmis.doc.ic.ac.uk/pr-1.wong-2002/overview.html, downloaded Sep. 24, 2008, 4 pages.

Miyauchi et al., "Highlight Detection and Indexing in Broadcast Sports Video by Collaborative Processing of Text, Audio, and Image," Sytstems and Computers in Japan, vol. 34, No. 12, 2003, pp. 22-31, Translated from Denshi Joho Tsushin Gakkai Ronbunshi, vol. J85-D-II, No. 11, Nov. 2002, pp. 1692-1700.

Nitta, Naoka et al., "Automatic Story Segmentation of Closed-Caption Text for Semantic Content Analysis of Broadcasted Sports Video," 8th International Workshop on Multimedia Information Systems, 2002, pp. 110-116.

Miura, K. et al., "Automatic Generation of a Multimedia Encyclopedia from TV Programs by Using Closed Captions and Detecting Principal Viedo Objects," Proceedings of the Eigth IEEE International Sympsosium on Miltumedia (ISM '06), 2006, IEEE, 8 pages.

Apple Inc., Apple iTunes, http://www.apple.com/itunes/, Apr. 28, 2003, 2 pages, United States.

Babaguchi, N. et al., "Intermodal Collaboration: A Strategy for Semantic Content Analysis for Broadcasted Sports Video," IEEE International Conference on Image Processing, Sep. 2003, pp. 13-16, vol. 1, Barcelona, Spain.

Brill, E., "A Simple Rule-Based Part of Speech Tagger," Third Conference on Applied Natural Language Processing, Mar. 1992, pp. 152-155, Trento, Italy.
Google Inc., Google Search Engine, http://www.google.com, Aug. 1998, 1 page, United States.
Google Inc., Google Desktop Search, http://desktop.google.com, Oct. 15, 2004, 1 page, United States.
Henzinger, M. et al., "Query-Free News Search," Proceedings of the 12th International Conference on World Wide Web, May 20-24, 2003, Budapest, Hungary, ACM Press, New York, NY, May 2003, pp. 1-10, United States.
Livingston, K. et al., "Beyond Broadcast: A Demo," Proceedings of the 8th international Conference on Intelligent User Interfaces, Jan. 12-15, 2003, Miami, Florida, USA, ACM Press, New York, NY, Jan. 2003, p. 325, United States.
Microsoft Corporation, Microsoft Windows Media Player, http://www.microsoft.com/windows/windowsmedia/, Feb. 1999, 1 page, United States.
Microsoft Corporation, MSN TV, http://www.webtv.com/pc, Feb. 2006, 1 page, United States.
Opera Software ASA, Opera Browser for Devices, http://www.opera.com/products/devices/, Mar. 2006, 2 pages, United States.
Rau, L.F. et al, "Domain-Independent Summarization of News," In Summarizing Text for Intelligent Communication, Jun. 1994, pp. 71-75, Dagstuhl, Germany.
Spalti, M., "Finding and Managing Web Content with Copernic 2000," Library Computing, vol. 18, No. 3, Westport, Sep. 2000, pp. 217-221, United States.
Tjondronegoro, D. et al., "Extensible Detection and Indexing of Highlight Events in Broadcasted Sports Video," Proceedings of the 29th Australasian Computer Science Conference, Hobart, Tazmania, Australia, Conferences in Research and Practice in Information Technology, vol. 48, Australasian Computer Society Inc., Jan. 2006, pp. 1-10, Sydney, Australia.
Wachman, J. et al., "Tools for Browsing a TV Situation Comedy Based on Content Specific Attributes," Multimedia Tools and Applications, vol. 13, No. 3, Kluwer Academic Publishers, Boston, Massachusetts, Mar. 2001, pp. 255-284, United States.
Yahoo! Inc., http://search.yahoo.com, Dec. 1998, 1 page, United States.
Zhuang, Y. et al, "Applying Semantic Association to Support Content-Based Video Retrieval," International Workshops on Very Low Bitrate Video Coding (VLBV 1998), Oct. 1998, pp. 1-4, United States.
U.S. Non-final Office Action for U.S. Appl. No. 12/056,184 mailed on Jun. 11, 2010.
U.S. Final Office Action for U.S. Appl. No. 12/056,184 mailed on Nov. 23, 2010.
Copernic Inc., http://copernic.com/en/products/desktop-search/index.html, Sep. 18, 2008.
Office Action dated Aug. 19, 2011 from U.S. Appl. No. 11/821,938.
Office Action dated Aug. 22, 2011 from U.S. Appl. No. 11/981,019.
Final Office Action dated Sep. 1, 2011 from U.S. Appl. No. 12/263,089.
Office Action dated Sep. 8, 2011 from U.S. Appl. No. 12/544,994.
Final Office Action dated Sep. 21, 2011 from U.S. Appl. No. 11/633,880.
Notice of Allowance dated Nov. 1, 2011 from U.S. Appl. No. 11/821,938.
Ricci et al. "Acquiring and Revising Preferences in a Critique-Based Mobile Recommender System." Journal IEEE Intelligent Systems, vol. 22 Issue 3, May 2007.
Chinese Office Action dated Dec. 14, 2010 from Chinese Application No. 20088003361.4.
Chinese Office Action dated Aug. 14, 2009 from Chinese Application No. 2008100826213.
Chinese Office Action dated Feb. 1, 2011 from Chinese Application No. 200710196237.1.
Notice of Allowance dated Dec. 6, 2011 from U.S. Appl. No. 11/789,609.
Office Action dated Dec. 15, 2011 from U.S. Appl. No. 12/263,089.
Chinese Office Action dated Mar. 25, 2010 from Chinese Application No. 2008100826213.
Notice of Allowance dated Mar. 2, 2012 from U.S. Appl. No. 11/789,609.

* cited by examiner

METHOD AND SYSTEM FOR FACILITATING INFORMATION SEARCHING ON ELECTRONIC DEVICES

RELATED APPLICATION

This application claims priority from U.S. Provisional Patent Application Ser. No. 60/898,257, filed on Jan. 29, 2007. This application is further a Continuation-in-Part of U.S. patent application Ser. No. 11/713,370, filed on Mar. 1, 2007, which in turn claims the benefit of priority of U.S. Provisional Patent Application Ser. No. 60/780,400, filed on Mar. 7, 2006. This application is further a Continuation-in-Part of U.S. patent application Ser. No. 11/713,350, filed on Mar. 1, 2007, which in turn claims the benefit of priority of U.S. Provisional Patent Application Ser. No. 60/780,398, filed on Mar. 7, 2006. This application is further a Continuation-in-Part of U.S. patent application Ser. No. 11/713,312, filed on Mar. 1, 2007, which in turn claims the benefit of priority of U.S. Provisional Patent Application Ser. No. 60/780,105, filed on Mar. 7, 2006. This application is further a Continuation-in-Part of U.S. patent application Ser. No. 11/725,865, filed on Mar. 20, 2007. This application is further a Continuation-in-Part of U.S. patent application Ser. No. 11/726,340, filed on Mar. 21, 2007. This application is further a Continuation-in-Part of U.S. patent application Ser. No. 11/732,887, filed on Apr. 5, 2007. This application is further a Continuation-in-Part of U.S. patent application Ser. No. 11/789,609, filed on Apr. 25, 2007. This application is further a Continuation-in-Part of U.S. patent application Ser. No. 11/803,826, filed on May 15, 2007. This application is further a Continuation-in-Part of U.S. patent application Ser. No. 11/821,938, filed on Jun. 26, 2007, which in turn claims the benefit of priority of U.S. Provisional Patent Application Ser. No. 60/903,962, filed on Feb. 28, 2007. This application is further a Continuation-in-Part of U.S. patent application Ser. No. 11/823,005, filed on Jun. 26, 2007, which in turn claims the benefit of priority of U.S. Provisional Patent Application Ser. No. 60/904,044, filed on Feb. 28, 2007. This application is further a Continuation-in-Part of U.S. patent application Ser. No. 11/825,161, filed on Jul. 5, 2007, which in turn claims the benefit of priority of U.S. Provisional Patent Application Ser. No. 60/904,044, filed on Feb. 28, 2007. This application is further a Continuation-in-Part of U.S. patent application Ser. No. 11/879,569, filed on Jul. 20, 2007. This application is further related to co-pending U.S. patent application Ser. No. 11/981,019, filed on Oct. 31, 2007. This application is further a Continuation-in-Part of U.S. patent application Ser. No. 11/969,837, filed on Jan. 4, 2008, which in turn claims the benefit of priority of U.S. Provisional Patent Application Ser. No. 60/906,082, filed on Mar. 9, 2007.

FIELD OF THE INVENTION

The present invention relates to providing relevant information to users, and in particular to providing relevant information to users with reduced user input.

BACKGROUND OF THE INVENTION

The Internet has become a popular source of entertainment and information. Most Internet content is designed for access via a web browser, making it difficult for access via most consumer electronics (CE) devices which lack typical computer keyboards. As a result, the Internet is generally restricted to access on personal computers (PC) or via cumbersome interfaces on CE devices.

With advances in hardware and software technologies, CE devices are becoming more powerful. Growth in network infrastructure and the falling prices of hardware have increased the availability of network-capable entertainment devices. Many users are configuring home networks including cable set-top boxes, digital television sets, home media servers, digital audio players, personal video recorders, etc. Home network consumers are also creating, storing and accessing more digital content through CE devices and PCs.

A second trend, running in parallel to the emergence of networked entertainment devices, is the growing use of the Internet for creating and publishing content. Greater broadband penetration and falling memory prices are enabling users to move ever larger media files, such as television (TV) shows and full-length movies, through the Internet.

However, there is a gap between the digital content on the Internet and the networked digital entertainment devices in that most Internet content is structured and organized for access via a web browser not a typical CE device. For example, typically a user searches for Internet information using a search engine or by directly accessing a known website via a PC. When using a search engine, the user is required to form an initial query and then iteratively refine the query depending upon the results obtained. As such, the user is forced to comprehend and analyze large quantities of information to identify/access the exact information the user is looking for. This process may work on a PC, but on CE devices that lack a keyboard and a mouse, the searching/refinement process is awkward and unpleasant. Moreover, users typically expect a "lean-back" experience when it comes to using CE devices in their homes and home networks. For instance, someone watching a television news program on a television may not be inclined to conduct an Internet search if such a search requires any effort more than pushing a few buttons on a remote control.

BRIEF SUMMARY OF THE INVENTION

The present invention provides a method and system for facilitating information searching for a user of an electronic device. One embodiment involves obtaining information about the user interests, identifying potential data of interest to the user, extracting data related to said data of interest to the user, and collecting the extracted related data for presentation to the user on the device.

Identifying potential data of interest to the user may include monitoring user access to content, selecting a set of extraction rules for information extraction, and extracting key information from metadata for the content based on the selected extraction rules.

Selecting a set of extraction rules may include selecting a set of extraction rules based on the content type. Selecting a set of extraction rules may include selecting a set of extraction rules from a rules library based on the content type, wherein the rules library includes a list of rules for extracting various keywords.

Obtaining information about the user interests may include obtaining information about current user activity on the device. Obtaining information about the user interests may further include obtaining contextual information about current user activity on the local network.

Extracting data related to said data of interest to the user may include forming a query based on potential data of interest, to search for said related data. The query is executed to search for related information on a local network and/or external sources. The device may comprise a consumer electronics device, and executing the query may include searching the Internet for said related data.

These and other features, aspects and advantages of the present invention will become understood with reference to the following description, appended claims and accompanying figures.

DETAILED DESCRIPTION OF THE INVENTION

The present invention provides a method and system for facilitating access to information via electronic devices such as consumer electronic (CE) devices. One embodiment involves enabling home users to easily find and access Internet content related to content presented on a CE device. An example is enabling a user to easily find and access Internet content related to a program the user is watching on a television. The user is now able to access relevant information and video content on the Internet in a "lean-back" living room experience while watching TV.

Searching for information on the Internet typically involves two stages: search query formation, and data search and analysis. Query information involves forming a search query that describes the type of information being sought. Data search and analysis involves resolving the search query according to the following steps: potential sources of data are identified; relevant data from such sources are extracted via search queries and then aggregated (collected); and correlations in the form of associations among the aggregated data are identified to make the results more meaningful.

Figure 1:
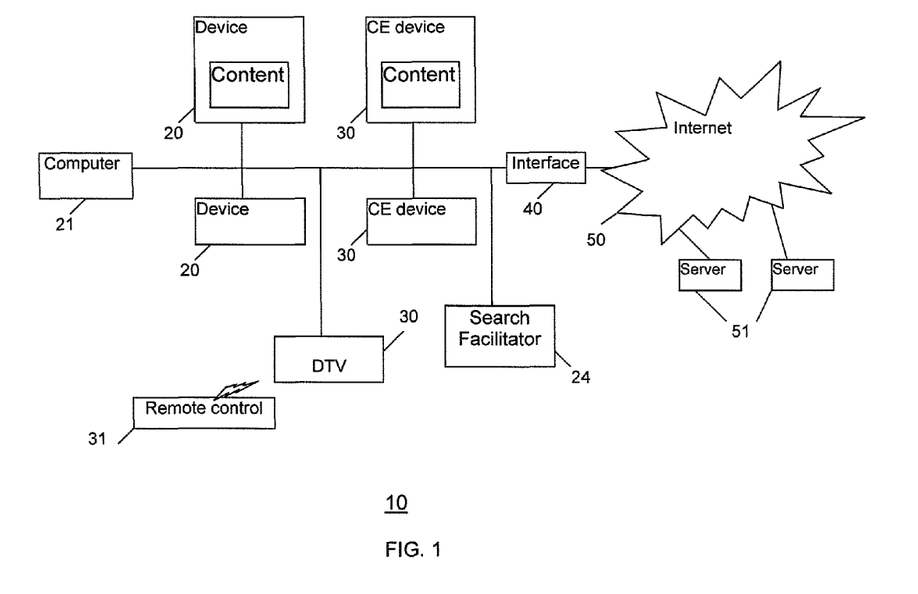
FIG. 1 shows a network implementing a process for facilitating information searching for users, according to an embodiment of the present invention.

An example implementation for CE devices in a local area network (LAN), such as a home network, is described below, however the present invention is useful with other electronic devices, and electronic devices that are not in a LAN but have access to the Internet. FIG. 1 shows a functional architecture of an example network/system 10, such as a LAN of home devices, embodying aspects of the present invention. The network/system 10 comprises devices 20 such as appliances, a personal computer (PC) 21, CE devices 30 which may include content, and an interface 40 that connects the network/system 10 to an external network 50 (e.g., another local network, the Internet). The external network 50 can be connected to one or more servers 51. The network/system 10 can implement the Universal Plug and Play (UPnP) protocol or other network communication protocols (e.g., Jini, HAVi, IEEE 1394, etc.). The network/system 10 can be a wireless network, a wired network, or a combination thereof. Examples of CE devices include digital televisions (DTVs, PDAs, media players, etc.).

The network 10 further includes a search facilitator system 24 that provides searching, aggregation and analysis functions. The facilitator 24 performs query formation, data search and analysis, wherein query formation includes identifying potential search queries (i.e., potential data of interest to the user) based on the user's context. Further, data search and analysis includes extracting, aggregating and correlating data of interest using execution plans.

Figure 2:
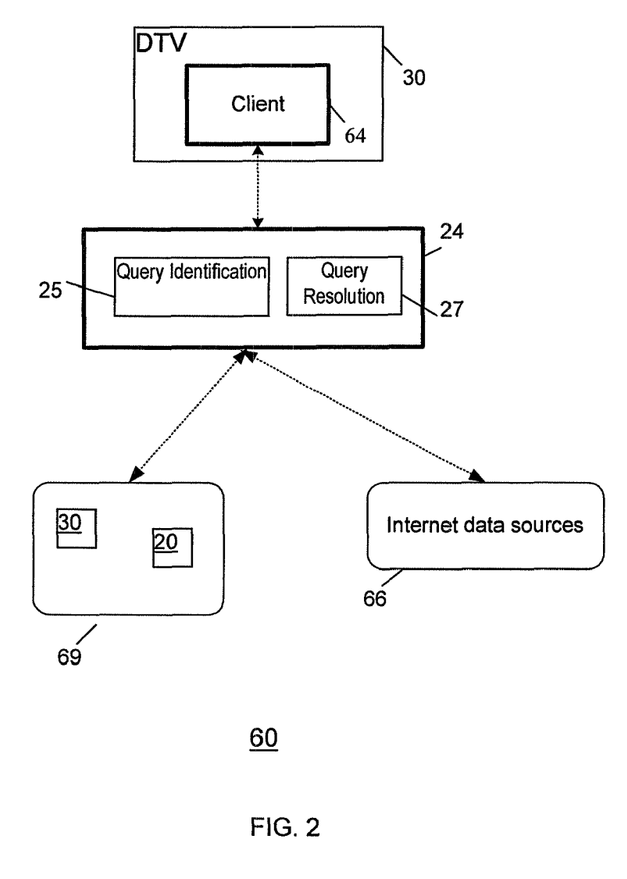
FIG. 2 shows an example architecture for facilitating information searching, according to the invention.
Figure 3:
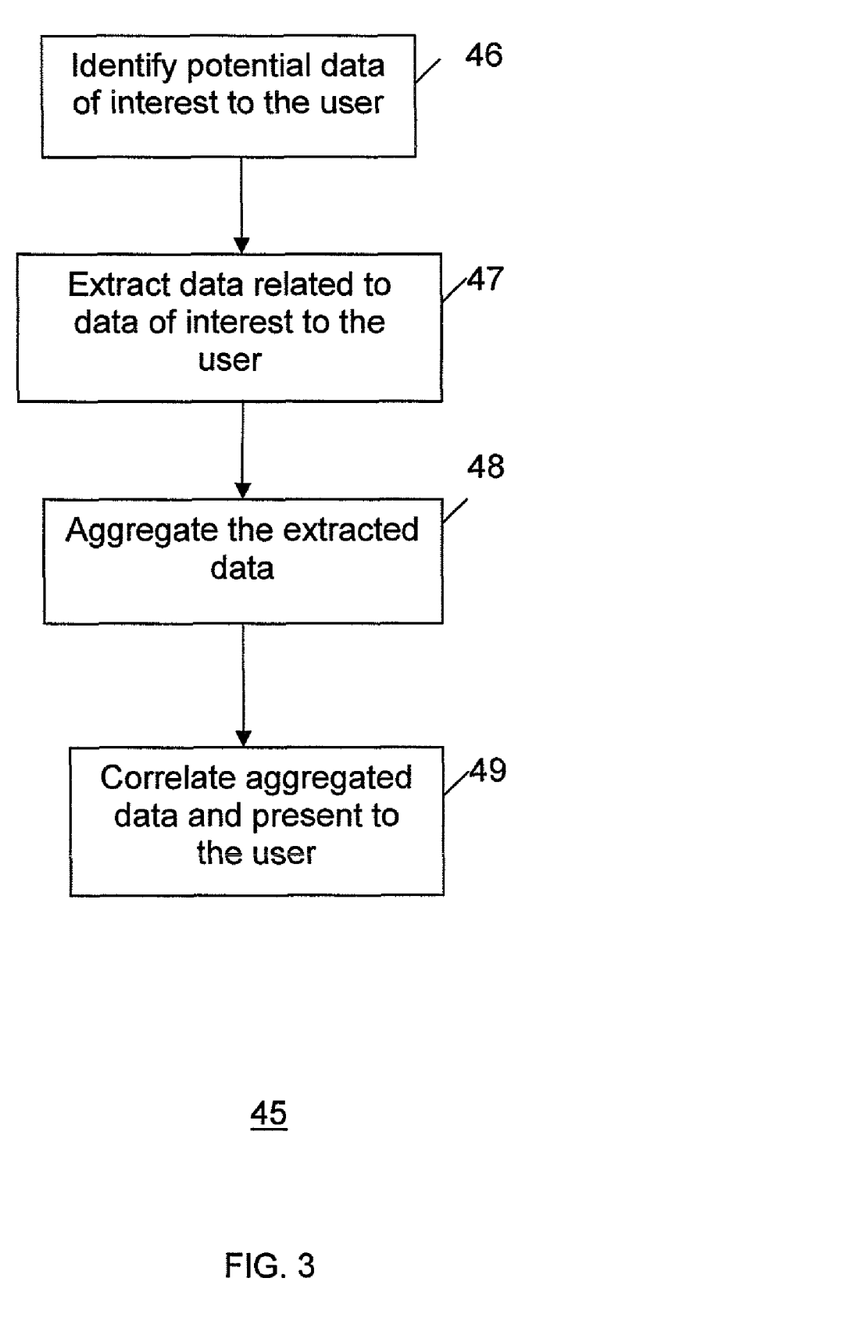
FIG. 3 shows a flowchart of the overall steps involved in facilitating information searching, according to the invention.

FIG. 2 shows an architecture 60 including the facilitator 24, according to an embodiment of the present invention. The architecture 60 implements searching, aggregation and analysis functions via the facilitator 24, to provide information to a user through a user interface of a client module 64 that, in this example, is implemented in a CE device such as the DTV 30. Referring to the example process 45 in FIG. 3, in order to free users from the involved process of query formation, the facilitator 24 identifies potential data of interest to the user (step 46), extracts data related to data of interest to the user (step 47), aggregates the extracted data (step 48) and correlates the said related data to present to the user (step 49).

Information of interest to the user, or user-related information, may include one or more of: user profile, user preferences, content previously/currently accessed by the user, terms previously selected by the user, etc.

In one example, the client module 64 enables the user to obtain desired information from, e.g., the Internet using a simple and intuitive Graphical User Interface (GUI) application, utilizing the facilitator 24, including:

1. Mapping the functionalities that support an information search to a small number of keys (e.g., mapping such functionalities to a few keys of a TV remote control 31 (FIG. 1), as an example for receiving user input when using a DTV 30 for information access).
2. Enabling the user to express interest in obtaining additional information related to information currently accessed by the user (e.g., providing an "info." button on the remote control 31 for the user to press, and mapping this action into a "more info" request, etc.).
3. Enabling the user to indicate the specific type of additional information the user is looking for, after the user has expressed interest in accessing additional information. An example involves displaying a set of keywords related to the data that the user has expressed interest in (e.g., a TV program or media content the user is accessing). Then, providing a combination of keys (e.g., up/down/right/left arrow keys) on a remote control 31 for the user to select one of the keywords as a search query.
4. Enabling the user to refine or edit a suggested keyword/search query, such as by displaying a set of additional query suggestions that contain, or are related to, the selected keyword and providing a combination of the arrow keys (up/down/right/left arrows) on the remote control 31 for the user to select one of the query suggestions. The GUI allows the user to refine the search queries as many times as the user desires by just repeating the process described above. Further, the query suggestions are displayed in an editable text box that allows the user to delete existing characters or enter new characters to modify the query as desired. This can be performed using, e.g., a wireless keyboard or a remote control that has an inbuilt keypad.
5. Performing a search based on a formulated query. Then, enabling the user to access the search results by displaying a list of search results corresponding to the keyword previously selected by the user. Then, providing a combination of arrow keys (up/down/right/left arrows) on the remote control device 31 for the user to select one of the refined search results. An example of a search result includes a link to a web page containing information about the search query, wherein the title of the web page is displayed to the user on the GUI.

The user utilizes the client module 64 to access certain content, and the facilitator 24 obtains information related to the accessed content for display to the user. The user then requests that the facilitator 24 provide more information about the accessed content. For example, the user utilizes the client module 64 to request that the facilitator 24 provide more information from Internet data sources 66 about a prerecorded/broadcast TV program the user is watching on the DTV 30.

Using the client module 64, the user can choose, edit or enter new queries (such as the suggested keywords/categories) with minimal effort on a CE device that may not have a keyboard/mouse. Specifically, the facilitator 24 suggests and displays queries including keywords related to the TV program and information categories related to those keywords. Using the suggested keywords and categories as search queries, users can seamlessly browse/search for related information available on the Internet through their CE devices by simply selecting among the suggested queries for searching. The facilitator 24 identifies many relevant search queries, and allows the user to edit a suggested query or enter a new query. The facilitator 24 then obtains information of interest to the user and presents such information to the user.

In the architecture shown in FIG. 2, the facilitator 24 includes a query identification function 25 and a query resolution function 27, which implement the above steps. Specifically, the query identification function 25 identifies potential data of interest to the user. The query resolution function 27 extracts identified data of potential interest to the user (e.g., from local sources 69 and/or Internet sources 66), aggregates the extracted data and correlates the aggregated data for presentation to the user. The operations of the query identification function 25 and the query resolution function 27 are described below.

In one example, the query identification function 25 identifies potential data of interest to the user, based on the user's current application state. Current application state refers to the state of the application that the user is using at the time the user desires to access relevant Internet content. For example, if the user is watching a television program on DTV 30, the channel the DTV is tuned to and the program being broadcast, constitute the application state.

The query identification function 25 identifies the content used/rendered by the application. Then, the query identification function 25 obtains metadata information and/or other associated data for the content being accessed, and identifies potential search queries that might represent the data of interest to the user. When a user accesses content that has structured meta-data available, the query identification function 25 directly uses field/value pairs from the metadata as potential search queries. For example, if a user is listening to a music album by the artist "Sting" and expresses interest to access related content, the query identification function 25 obtains the following fields from the album's metadata (content="MusicAlbum" & artist="Sting") and using these, the query identification function 25 infers that the user might be interested to access more albums by the same artist and suggests (MusicAlbum, artist, "Sting") as one of the search queries to the user.

When a user accesses content such as broadcast TV programs and DVDs, the query identification function 25 uses the caption data (closed captions), that is embedded in the content stream, to identify potential search queries. This embedded caption data contains useful information in the form of keywords. When a user watches a TV program and expresses interest to access related content, the query identification function 25 analyzes the TV program's caption text to identify significant keywords and suggests them to the user as possible search queries.

The query identification function 25 can be implemented, e.g., in a stand-alone module, in a device 20 such as a set-top box or in a CE device 30 such as a DTV. A user interface (UI) can be displayed on a device in the network/system 10 capable of displaying information, such as a CE device 30. An example of identifying keywords and suggesting them as possible search keywords by the query identification function 25 utilizing natural language processing (NLP) to analyze closed captions and identify keywords from the captions, is described below.

Figure 4:
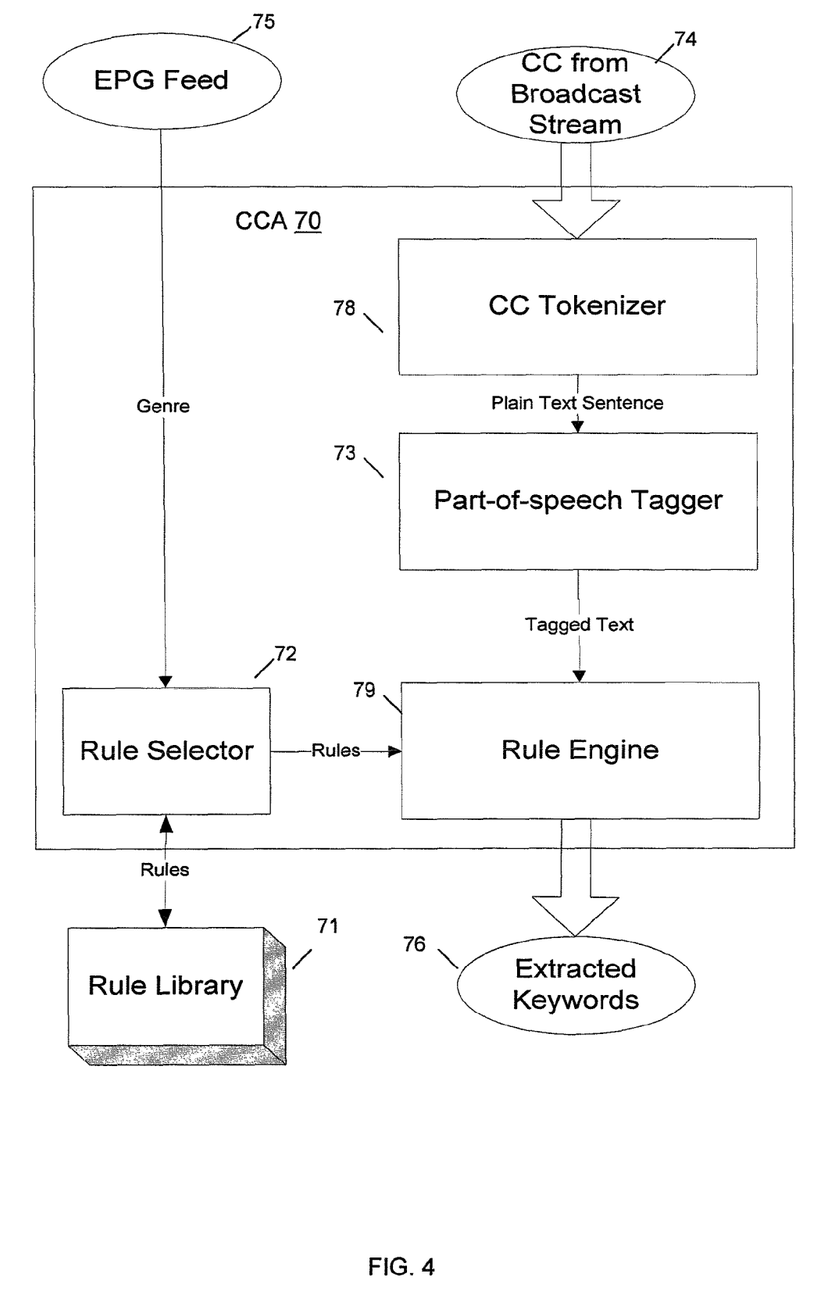
FIG. 4 shows an example of keyword selection, according to the invention.

The closed captions (CC) of a TV program are embedded in the TV signal by the content provider before it is broadcast. They are primarily for the benefit of the hearing impaired. Extracting useful information from this text is not straightforward. The captions typically do not contain any case information, precluding any attempt to extract proper nouns based on case information. Also, they are often ungrammatical (e.g., because of the spoken nature of the content), poorly punctuated and may have typos. Because of these limitations, typical keyword extraction techniques used for text documents may not be suitable for closed caption text. In addition, the content of closed captions is highly dependent on the type of the program. A news program's captions are high-content and factual, whereas a sitcom's captions are typically low on content and full of slang. FIG. 4 shows a closed caption analyzer (CCA) 70 according to an embodiment of the present invention. The CCA extracts search queries from closed captions of a program using NLPs techniques and the Electronic Program Guide (EPG) information 75 to customize the extraction mechanism for different types of programs.

Figure 5:
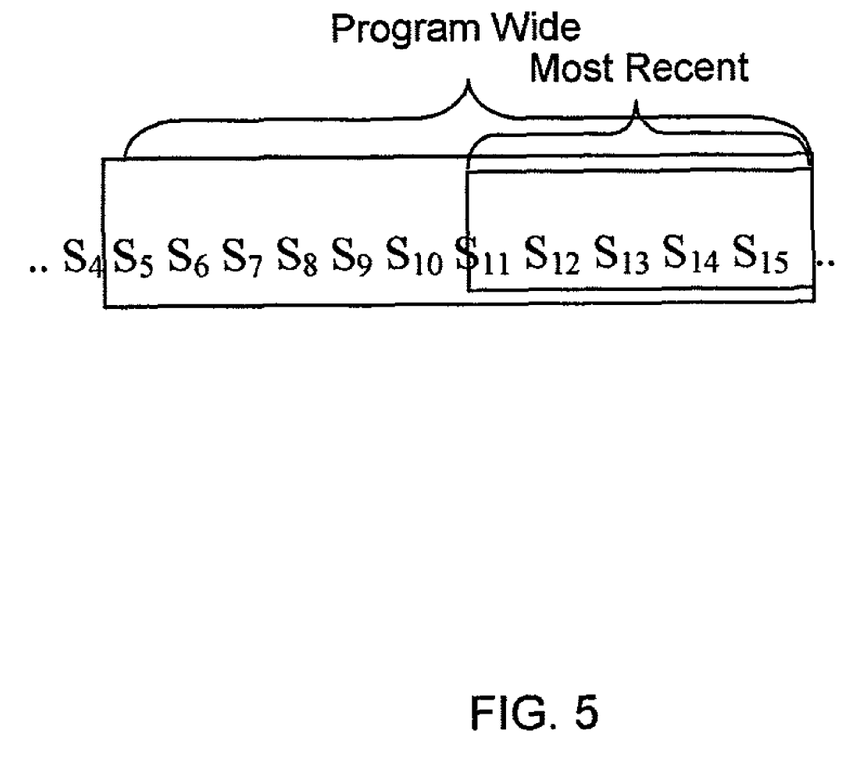
FIG. 5 shows an example of tokenizing, according to the invention.

The CCA 70 operates in real-time on broadcast signals and processes a steady stream of closed caption text 74 entering the system. The CCA maintains two history windows over the stream of incoming text (FIG. 5). The smaller, most recent window, spans the last N (N=5 in our prototype) sentences ($S_i$) and the larger program wide window covers the entire TV program/current news story/current program section, etc. Only the keywords extracted from the program wide window are stored and indexed for recommendation. Also, the keywords extracted from the most recent window are ranked higher than others, such that the most recent keywords appear at the top of the list of keywords presented to the user. As soon as the program or the news story changes (indicated either by special characters in the closed captions, such as '>>>' in the U.S., or determined by looking at the EPG and the current time) both the windows are flushed and restarted.

A CC Tokenizer 78 receives the stream of CC text 74 and breaks it down into sentences. This is done in order to preserve the grammar of the text. A tagger 73 then tags sentences, e.g., using Brill's part-of-speech tagging (Brill 1992). The tagger 73 analyzes the sentence and determines how each word is used in the sentence. The tagger 73 uses lexical rules to assign an initial tag to each word in a sentence, and then uses contextual rules to update the tag based on the context in which the word occurs. The contextual rules are sensitive to the grammar of the input sentence. Ungrammatical or incomplete sentences may result in incorrect tagging of the words in the sentence.

In one example, for an input sentence: "John Wayne ran home":

The output of tagger 73 would be:

John<PROP>    Wayne<PROP>    ran<VB_PST>    home<NOUN>

This indicates that in the previous sentence, "John" and "Wayne" are used as proper nouns, "ran" is a verb in past tense and "home" is a noun.

This tagged sentence from the tagger 73 is then passed on to a rule engine 79 which extracts keywords from the tagged sentence based on extraction policy rules from a rule library 71. A rule library 71, R, is an exhaustive set of rules that can be used to extract different kinds of phrases appearing in the sentence. The rules are represented as tag patterns. For example, it may have a rule to extract consecutive proper nouns (<PROP>+) and another rule to extract an adjective followed by one or more nouns (<ADJ> <NOUN>+), etc. A rule selector 72 includes a mapping from genre to an extraction policy. The genre of the program being watched determines the type of keywords to extract from the captions. For example, if the program being watched is a high-content, factual program such as news, the extraction policy is highly aggressive, essentially extracting additional differing types of keywords (e.g., sequences of nouns, compound nouns, proper nouns etc.). On the other hand, if the program is a low-content, non-factual program such as a sitcom, a very conservative extraction policy is used, extracting keywords very selectively, extracting only those keywords considered as having a higher likelihood of being useful (e.g., only proper nouns). The rule engine 79 alters its extraction behavior depending upon the type of program being watched.

Each extraction policy, $P_e$, corresponds to a subset of the rules in R. This mapping can either be preset, or it can be learned. The mapping essentially defines the kinds of patterns to be used for extracting keywords 76 from a particular type (genre) of program. In one example, the mapping can be determined by conducting a small user study involving four subjects asked to mark the keywords they would like to search for from CC transcripts of four types of sample programs: News, Sitcom, Talk Show and Reality TV. The transcripts were then tagged using Brill's tagger and the tags of the marked keywords were extracted as rules (e.g., if the keyword "Global Warming" in a news program was marked, and if the words were tagged "Global<ADJ> Warming<NOUN>", then "<ADJ> <NOUN>" is extracted as a rule for the genre "news"). The top ranking rules (based on frequency and a threshold) were used as the rules that form the extraction policy for that kind of program and the union of all rules for all types of programs forms R. This facilitates reusability of rules and extraction policies. The rule engine 79 applies the extraction policy on the text received from the tagger 73 and extracts keywords from it. These keywords are then weighted based on whether they occur in the most recent window. The weighted keywords are then ordered and presented to the user.

The extracted keywords identify information of potential interest to the user. The query resolution function 27 enables extracting data related to identified data of potential interest to the user, aggregating the extracted data and correlating the aggregated data. Such correlation involves identifying associations between data. For example, data A is 'similar to' or the 'same as' data B.

The query resolution function 27 can be implemented, e.g., in a stand-alone module, in a device 20 such as a set-top box or in a CE device 30 such as a DTV. An example implementation of extracting, aggregating and correlating data by the query resolution function 27 utilizing query plans is described below. XML-based execution plans are provided which encapsulate the steps involved in a search query resolution process. An execution plan comprises one or more plan-steps and each plan-step essentially specifies the type of task (i.e., data extraction, aggregation or correlation) to be performed.

Further, special classes, termed RuleLets, are provided to execute the three tasks (i.e., data extraction, aggregation or correlation) in a typical query resolution process. The RuleLets are: GetDataRuleLet, MergeDataRuleLet and GetContentNotInHomeRuleLet. The GetDataRuleLet obtains data from different data sources, the MergeDataRuleLet merges data obtained from different data sources and the GetContentNotInHomeRuleLet identifies the data/content (from a collection of data extracted from different sources) that are not available on the home devices.

A plan-step essentially specifies the RuleLet to be executed and the set of input and output parameters required for the execution of the RuleLet. The specific fields in a plan-step include the name of the RuleLet to be executed, the input data required for the RuleLet execution, the output-type expected from the execution of the RuleLet and the scope of the desired output data (if applicable). The scope field is used to specify whether the required data should be available in the home ("Local") or on the "Internet." In order to cater to different kinds of search queries, a plan library containing different kinds of plans is maintained. When a user chooses a search query, the query resolution function 27 identifies a plan based on the context of the user (e.g., if the user is watching a TV program, DVD or music video, or listening to a music album).

The use of execution plans in a search scenario in conjunction with example execution plans is described below. The search scenario involves a case where a user is watching a broadcast documentary program titled "Drumming Techniques" on a TV. When the user expresses interest to access related Internet content, the search facilitator 24 identifies and displays potential search queries from the program's closed captions (using the techniques described above) by executing the following plan steps: obtain the EPG related to the TV program being watched by the user; obtain keywords from the EPG information obtained in the previous step; obtain the genre of the TV program; based on the genre obtain significant keywords from the closed captions of the TV program; and merge the keywords identified from the EPG and the closed captions. An XML version of such a plan comprises:

```
<?xml version="1.0" ?>
<Plan>
    <Plan-step>
        <RuleLet>GetDataRule</RuleLet>
        <OutputType>EPGInfo</OutputType>
        <Scope>Internet</Scope>
    </Plan-step>
    <Plan-step>
        <RuleLet>GetDataRule</RuleLet>
        <InputType>EPGInfo</InputType>
        <OutputType>KeywordsFromEPG</OutputType>
        <Scope>Local</Scope>
    </Plan-step>
    <Plan-step>
        <RuleLet>GetDataRule</RuleLet>
        <OutputType>ProgramGenre</OutputType>
        <Scope>Local</Scope>
    </Plan-step>
    <Plan-step>
        <RuleLet>GetDataRule</RuleLet>
        <InputType>ProgramGenre</InputType>
        <OutputType>KeywordsFromCaptions</OutputType>
        <Scope>Internet</Scope>
    </Plan-step>
    <Plan-step>
        <RuleLet>MergeDataRule</RuleLet>
        <InputType>KeywordsFromEPG</InputType>
        <InputType>KeywordsFromCaptions</InputType>
        <OutputType>LiveTVKeywords</OutputType>
        <Scope>Local</Scope>
    </Plan-step>
```

</Plan>

The keywords obtained by executing this plan are then displayed to the user. One of the keywords/potential search queries displayed is: "Polyrthymic Drumming". The user chooses "Polyrthymic Drumming" and expresses interest to see more related videos that the user has not seen before. To resolve this request, the facilitator 24 executes a plan, with "Polyrthymic Drumming" set as the keyword, including the plan steps: obtain videos related to the keyword ("Polyrthymic Drumming") that are available on the Internet sources 66 (FIG. 2); identify pre-recorded videos available in the home related to "Polyrthymic Drumming"; filter out videos in the list resulting after the last step that are already available in the local sources 69. An XML version of such a plan comprises:

```
<?xml version="1.0" ?>
<Plan>
        <Plan-step>
        <RuleLet>GetDataRule</RuleLet>
        <InputType>Keyword </InputType>
        <OutputType>RelatedVideos</OutputType>
        <Scope>Internet</Scope>
            </Plan-step>
            <Plan-step>
        <RuleLet>GetDataRule</RuleLet>
        <InputType>Keyword </InputType>
        <OutputType>RecordedVideos</OutputType>
        <Scope>Local</Scope>
            </Plan-step>
            <Plan-step>
        <RuleLet>GetContentNotInHomeRule</RuleLet>
        <InputType>RelatedVideos</InputType>
        <InputType>RecordedVideos</InputType>
        <OutputType>InternetVideosNotInHome</OutputType>
        <Scope>Local</Scope>
            </Plan-step>
</Plan>
```

The related Internet videos that are not already available in the local sources 69 are displayed to the user on the client module.

Figure 6:
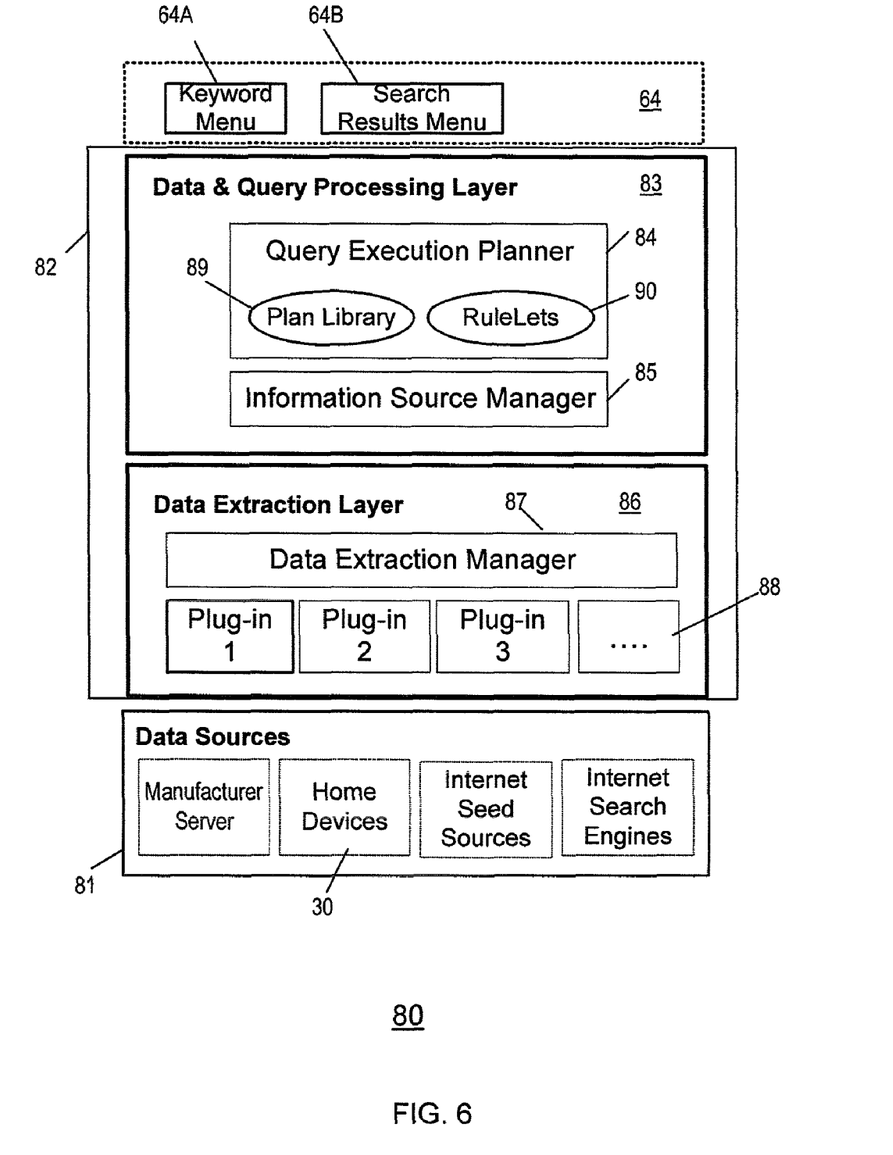
FIG. 6 shows an architecture of facilitating searching using execution plans, according to the invention.

FIG. 6 shows an example functional architecture 80 for the facilitator system implemented as a context-specific search facilitator system (CSF) 82. The CSF 82 provides query identification functions (e.g., keyword extraction) and query resolution functions (e.g., data extraction, aggregation and correlation), as described above. The CSF 82 includes different layers to enable seamless CE device and Internet content from the data sources 81 for search and access.

The CSF 82 includes a data and query processing (DQP) layer 83. The DQP 83 assists in resolving user queries and also provides an API for client applications 64 to make use of. Though client applications 64 are shown external to the CSF 82, the client applications 64 can also be components of the CSF 82. The DQP 83 includes a query execution planner (QEP) 84 and an information source manager (ISM) 85. The CSF 82 further includes a data execution (DE) layer 86. The DE 86 includes a data extraction manager (DEM) 87 and multiple plug-ins 88.

The QEP 84 provides interfaces for client applications to search for and access locally available data (i.e., data stored on the devices 30 and/or 20) and related data available on the Internet. The QEP 84 maintains a plan library 89, containing a set of pre-defined execution plans that are used to resolve requests for data. The QEP 84 also maintains the RuleLet 90 classes that are executed as part of a plan. When the QEP 84 receives a query from a client application, the QEP 84 retrieves the relevant plan from its plan library 89 and executes it. During the plan execution, the QEP 84 gathers the information/content requested by the user using the plug-ins 88 in the data extraction layer 86 (via the ISM 85). The ISM 85 manages a directory containing details about the types of data each data extraction plug-in component could extract and the input data (if any) expected by the plug-ins 88 to do so. This allows the QEP 84 to identify the plug-in 88 that provides a specific type of data.

The DE 86 includes many plug-ins 88 for extracting content/information from local and Internet data sources. 81 Local data sources refer to, e.g., home devices. Internet data sources include seed sources (e.g., BarnesandNoble.com, YouTube.com) and Internet search engines (e.g., Google, Yahoo). The functionalities provided by the different plug-ins 88 include: (1) A web scraper plug-in allows extracting specific information from specific websites; (2) A content manager plug-in allows accessing media content stored on the home devices; (3) An Internet video search plug-in allows searching for and accessing video content on the Internet; (4) A closed caption analyzer plug-in allows analyzing and identifying keywords from TV captions; and, (5) An EPG plug-in allows obtaining the EPG information for TV programs.

The DE 86 manages the plug-ins 88 and allows new plug-ins 88 to be added or removed with minimal code changes and provides an application programming interface for the higher-level components to use the plug-ins.

As an example of a search facilitation process by the CSF 82, according to the present invention, wherein a TV viewer accesses the Internet is as follows A user Trisha is watching a TV program on her TV about "Drumming Techniques" and is intrigued by the video. She wishes to learn more about the topics discussed in the program, especially about "Polyrhythmic drumming" which has just been mentioned. She presses a button on her TV remote control 31 and finds a host of information regarding the program being watched. A UI graphic on the client module screen shows two menus. One menu 64A provides a list of keywords related to the TV program (assembled by the query identification function of the CSF 82), and the first keyword "Polyrhythmic Drumming" is highlighted. The other menu 64B shows a list of search results (assembled by the query resolution function of the CSF 82) including web links containing information and/or videos related to the keyword "Polyrhythmic Drumming". Trisha notices that the second link on this menu is a "how to" video. Using the navigation buttons on her remote control she highlights this link, and then presses the "enter" button to select the video and start viewing it.

The above scenario illustrates the following essential features: first, the user need not enter text or queries at any point; interaction is via the navigation buttons on a conventional remote control. Second, the user is able to access desired related Internet information by pushing a few buttons, as there is no need to bring up a search page or enter search terms. In this scenario, the context of the user (the program being watched), helps focus the search to relevant content.

The process for providing relevant information to a user of a CE device on a local network such as a home network generally involves:

1. Gathering information about current activities of the user on the local network (e.g., listening to a song, watching a TV program);
2. Gathering contextual information about current user activity on the local network (e.g., finding the metadata of a song or a TV program);
3. Obtaining additional information interrelated to the information gathered in the above steps from other sources, such as the devices on the local network and/or information from external sources such as the Internet (e.g., obtaining information related to a song or a TV program);
4. Identifying correlations in the information obtained in the above steps;
5. Using the correlations in forming queries to search for information in local and/or external sources such as the Internet; and
6. Presenting the search results to the user as information related to the current user activity (i.e., information of interest to the user).

Identifying correlations can be performed in one or more of the following example ways: (1) identifying correlations between information about current user activity and the interrelated information obtained from local sources, (2) identifying correlations between information about current user activity and the interrelated information obtained from external sources, and (3) identifying correlations between information about current user activity and the interrelated information obtained from local and external sources.

In order to minimize the number of keystrokes a user has to enter to receive information related to the current user activity, functionalities that support information searching are mapped to a small number of keys (e.g., mapping searches to a few keys of a remote control). Then, certain information is gathered about current user activity on CE devices. This includes obtaining metadata contained in media that is accessible only by content-rendering CE devices (e.g., the length and type of content contained in a CD or a DVD).

The process further involves obtaining information embedded in broadcast streams that are accessible only by a receiving/rendering CE device (e.g., subtitles and closed captions). In addition, information is gathered about content already existing on the home network (e.g., songs by Sting that are already owned by the user and the corresponding metadata). Further information is gathered about relevant structured data that exists on the Internet (e.g., gathering metadata about the songs already owned by the user from a compact disk database (CDDB)). Additional relevant information is obtained from semi-structured data that exists on the Internet (e.g., the biography of an artist from the Internet Movie Database (IMDb) and/or from the relevant web pages). Further relevant information is gathered from unstructured data that exists on the Internet (e.g., URLs of the web pages carrying the geographical, economical, political and cultural information about the place from which main events are being reported in the news).

The gathered/obtained information defines the information at hand. Then, when a user operates a CE device, what the user inputs to a CE device is correlated with the information at hand to automatically form queries to search for related information. This minimizes the need for the user to generate queries or use a keyboard in forming queries.

Then, from the information at hand, the data extracted from the Internet sources is correlated with the data extracted from home network content to form a query plan to refine the queries for precise searching. The query plan is then executed for searching the queries on the external network (e.g., the Internet, other resources), without requiring user intervention. The query execution results, in the form of search results, are then presented to the user. Preferably, based on the information at hand, the most relevant information from the search results is selected for presentation to the user, without requiring user intervention. Therefore, the information presented to the user includes information of potential interest to the user as related to the information at hand.

Another example of facilitating searches for the user involves obtaining information about current user activity on a local network, obtaining contextual information about current user activity on the local network, obtaining additional information interrelated to the contextual information and the user activity information, identifying correlations between the additional information, the contextual information and the user activity information, and using the correlations in forming a query to search for information related to the current user activity.

Obtaining additional information may include obtaining additional information interrelated to the contextual information and the user activity information, from sources including the local network and/or external sources. Identifying correlations may include identifying correlations between information about current user activity and interrelated information obtained from local sources. Identifying correlations may include identifying correlations between information about current user activity and the interrelated information obtained from external sources. Identifying correlations may include identifying correlations between information about current user activity and the interrelated information obtained from local and external sources.

Forming a query includes automatically forming a query, without requiring user intervention. The query is executed to obtain search results including information related to the current user activity. Executing the query further may include executing the query to search for related information on the local network and/or external sources. The search results may be presented to the user at this stage on a user interface in a device such as a CE device.

Obtaining information about current user activity on the local network may include obtaining information from user input to the device, or obtaining information from applications running in the network. Obtaining additional information may include obtaining the additional information from external structured data sources. Obtaining additional information may include obtaining additional information that is relevant to user interests from local media content sources.

Obtaining additional information may include obtaining the additional information from external unstructured data sources, from external semi-structured data sources, or from external broadcast data sources.

Obtaining contextual information about current user activity on the local network may include obtaining associated metadata available on the local network. As such forming a query may include using metadata related to the content on the local network for determining a context for query formation. Further, determining a context for query formation may include using metadata related to the content in the network and information from applications on the local network, to determine a context for query formation without requiring user intervention. The query may be used to search the Internet for information related to the current user activity or interest. As such, the above processes also enable improved access to the Internet to the users of CE devices.

As is known to those skilled in the art, the aforementioned example architectures described above, according to the present invention, can be implemented in many ways, such as program instructions for execution by a processor, program product stored on a computer useable medium, computer implemented method, as logic circuits, as an application specific integrated circuit, as firmware, etc. The present invention has been described in considerable detail with reference to certain preferred versions thereof; however, other versions are possible. Therefore, the spirit and scope of the appended claims should not be limited to the description of the preferred versions contained herein.

What is claimed is:

1. A method of facilitating information searching for a user of an electronic device, comprising:
   playing currently accessed multimedia data;
   placing all words from a closed caption stream for the currently accessed multimedia data in a program wide memory window;
   keeping a set of most recently received words from the closed caption stream in a most recent memory window distinct from the program wide memory window;
   extracting keywords from the words stored in the program wide memory window and the most recent memory window;
   weighting the extracted keywords, wherein keywords contained both in the most recent memory window and the program wide memory window are given greater weight than keywords contained only in the program wide memory window;
   presenting the weighted extracted keywords to the user for selection, wherein keywords with greater weight are displayed more prominently than those keywords having lesser weight;
   receiving a selection of one or more keywords from the presented weighted extracted keywords;
   performing a search using a search query that is based on the selected one or more keywords; and
   causing search results from the search to be displayed to the user.

2. The method of claim 1, wherein extracting keywords includes monitoring user access to content, selecting a set of phrase extraction rules for information extraction, and extracting key information from metadata for the content based on the selected phrase extraction rules.

3. The method of claim 2, wherein selecting a set of phrase extraction rules further includes selecting a set of phrase extraction rules based on the content genre.

4. The method of claim 3, wherein selecting a set of phrase extraction rules further includes selecting a set of phrase extraction rules from a rules library based on the content genre, wherein the rules library includes a list of rules for extracting various keywords.

5. The method of claim 2, further comprising;
   mapping a currently accessed content genre to a phrase extraction policy, wherein the phrase extraction policy includes determining type of keywords for extraction based on the currently accessed content genre, and wherein said mapping defines pattern types used for extracting keywords for a particular genre of a plurality of genres, from the currently accessed multimedia data.

6. The method of claim 5, wherein determining information about the user interests further includes obtaining contextual information about current user activity on the local network.

7. The method of claim 1, wherein performing a search includes searching the Internet.

8. The method of claim 1, further comprising purging both the program wide memory window and the most recent memory window are purged when the currently accessed multimedia data has completed playing.

9. The method of claim 8, wherein it is determined that the currently accessed multimedia data has completed playing by finding a predesignated character sequence in the closed caption screen identifying the end of a section.

10. The method of claim 8, wherein it is determined that the currently accessed multimedia data has completed playing by comparing a current time to an ending time identified for the currently accessed multimedia data in an electronic program guide entry for the currently accessed multimedia data.

11. An apparatus for facilitating information searching for a user of an electronic device, comprising:
   employing a hardware processor coupled with:
   an extractor configured for
   placing words from a closed caption stream for the currently accessed multimedia data in a program wide memory window;
   keeping a set of most recently received words from the closed caption stream in a most recent memory window distinct from the program wide memory window; and
   extracting keywords from the words stored in the program wide memory window and the most recent memory window;
   a collector for collecting the extracted keywords for weighting the extracted keywords, wherein keywords contained both in the most recent memory window and the program wide memory window are given greater weight than keywords contained only in the program wide memory window and presentation to the user for selection as a search query, wherein the extracted keywords with greater weight are displayed more prominently than those keywords having lesser weight; and
   a facilitator configured for performing a search using the search query.

12. The apparatus of claim 11, wherein the device comprises a consumer electronics device.

13. The apparatus of claim 12, wherein the extractor is further configured for executing the query by searching the Internet for said related data.

14. A system for facilitating information searching for a user, comprising:
   an electronic device for access to content; and
   a facilitator including:
   an extractor configured for placing words from a closed caption stream for the currently accessed multimedia data in a program wide memory window; keeping a set of most recently received words from the closed caption stream in a most recent memory window distinct from the program wide memory window; and extracting keywords from the words stored in the program wide memory window and the most recent memory window;
   a collector for collecting the extracted keywords and weighting the extracted keywords, wherein keywords contained both in the most recent memory window and the program wide memory window are given greater weight than keywords contained only in the program wide memory window and for presentation to the user on the device for selection as a search query, wherein the extracted keywords with greater weight are displayed more prominently than those keywords having lesser weight; and
   a facilitator configured for performing a search using the search query.

15. A program product stored on a computer useable medium for facilitating information searching for a user of an electronic device, the program product comprising program code instructions for causing a system to perform;
   determining contextual information form currently accessed multimedia data about the user interests;
   at a client side, identifying data of potential interest to the user base on the contextual information;

extracting data related to said data of potential interest to the user and forming a search query to access further information related to data of potential interest to the user, wherein forming the search query comprises extracting keywords from the currently accessed multimedia data and extracting a phrase from the extracted keywords based on a phrase based rule wherein the extracting the keywords includes:
  placing words from a closed caption stream for the currently accessed multimedia data in a program wide memory window;
  keeping a set of most recently received words from the closed caption stream in a most recent memory window distinct from the program wide memory window;
weighting the extracted keywords, wherein keywords contained both in the most recent memory window and the program wide memory window are given greater weight than keywords contained only in the program wide memory window;
presenting the weighted extracted keywords to the user in such a way that keywords contained with greater weight are displayed more prominently than those keywords having lesser weight;
receiving a selection of one or more keywords from the presented weighted extracted keywords;
performing a search using a search query that is based on the selected one or more keywords; and
collecting the extracted keywords and search results for presentation to the user on the device as additional information related to data of potential interest to the user.

16. An apparatus for facilitating information searching for a user, comprising:
  means for playing currently accessed multimedia data;
  means for placing all words from a closed caption stream for the currently accessed multimedia data in a program wide memory window;
  means for keeping a set of most recently received words from the closed caption stream in a most recent memory window distinct from the program wide memory window;
  means for extracting keywords from the words stored in the program wide memory window and the most recent memory window;
  means for weighting the extracted keywords, wherein keywords contained both in the most recent memory window and the program wide memory window are given greater weight than keywords contained only in the program wide memory window;
  means for presenting the weighted extracted keywords to the user for selection, wherein keywords with greater weight are displayed more prominently than those keywords having lesser weight;
  means for receiving a selection of one or more keywords from the presented weighted extracted keywords;
  means for performing a search using a search query that is based on the selected one or more keywords; and
  means for causing search results from the search to be displayed to the user.

17. A non-transitory program storage device readable by a machine tangibly embodying a program of instructions executable by the machine to perform a method for facilitating information searching for a user, the method comprising:
  playing currently accessed multimedia data;
  placing all words from a closed caption stream for the currently accessed multimedia data in a program wide memory window;
  keeping a set of most recently received words from the closed caption stream in a most recent memory window distinct from the program wide memory window;
  extracting keywords from the words stored in the program wide memory window and the most recent memory window;
  weighting the extracted keywords, wherein keywords contained both in the most recent memory window and the program wide memory window are given greater weight than keywords contained only in the program wide memory window;
  presenting the weighted extracted keywords to the user for selection, wherein keywords with greater weight are displayed more prominently than those keywords having lesser weight;
  receiving a selection of one or more keywords from the presented weighted extracted keywords;
  performing a search using a search query that is based on the selected one or more keywords; and
  causing search results from the search to be displayed to the user.

* * * * *